United States Patent Office 3,470,233
Patented Sept. 30, 1969

3,470,233
PROCESS FOR THE MANUFACTURE OF L-(—)-β-(3.4-DIHYDROXY-PHENYL)-α-METHYLALANINE
Hans-Joachim Bohn, Kelkheim, Taunus, and Günther Seidl, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 7, 1965, Ser. No. 470,208
Claims priority, application Germany, July 9, 1964, F 43,379; Sept. 4, 1964, F 43,911; Dec. 9, 1964, F 44,649; Apr. 9, 1965, F 45,772
Int. Cl. C07c 99/00, 101/00, 101/02
U.S. Cl. 260—473          11 Claims

ABSTRACT OF THE DISCLOSURE

Monoesters of L-α-(3,4-dimethoxybenzyl)-α-methyl malonic acid and of L-α-(3,4-diallyloxy-benzyl)-α-methyl malonic acid. Process for the manufacture of L-(—)-β-(3,4-dihydroxyphenyl)-α-methylalanine by resolving a racemic mixture of

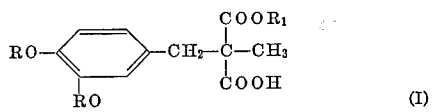

wherein R represents methyl and $R_1$ represents methyl, n-butyl, or benzyl, and if $R_1$ is methyl, R may also represent benzyl or allyl, into its optical isomers; esterifying the D-monoester; and hydrolyzing the diester to reform the monoester starting compound. The α-carboxy group of the L-compound is converted to an α-amino group by a Curtius or Hofmann rearrangement involving intermediate azide or isocyanate formation. The ether groups on the phenyl nucleus and the α-ester group are removed during the synthesis.

---

The preparation and the anti-hypertonic action of D,L-β-(3,4-dihydroxyphenyl)-α-methylalanine (D,L-α-methyl-DOPA) (I) have been known for some years [J. Amer. Chem. Soc. 77, 700 (1955); Arch. Expl. Path. Pharmacol. 234, 275 (1958)]. Recent investigations have shown that the L-form has a stronger action than the racemate (German patent application 1,171,931, laid open to public inspection).

The resolution of D,L-α-methyl-DOPA into its optical antipodes by inoculation of a supersaturated solution with crystals of the pure D- or L-form is already known (Belgian Patent No. 622,666). Since only the L-form has therapeutic utility, at least half of the material used in the racemate resolution of the final stage, i.e. the D-form which cannot be racemized, is either lost or must be retransformed into the starting material through several stages [J. Org. Chem. 29, 1424 (1964)].

Furthermore, it is known to prepare the L-isomer by converting 3,4-dimethoxyphenyl-acetone into the corresponding aminonitrile or hydantoin and subsequently hydrolizing and splitting off the O-methyl groups. In this known process, racemate resolution is carried out with D,L - N-acetyl-α-methyl-β-(3,4-diacetoxyphenyl)-alanine or with the corresponding 3,4-dimethoxy-compound, but should also be possible employing any intermediate product containing nitrogen.

Now we have found that L-(—)-β-(3,4-dihydroxyphenyl)-α-methylalanine (L-α-methyl-DOPA) can be prepared by a new economical and simple process. This process is characterized in that a mono-ester of the general Formula II

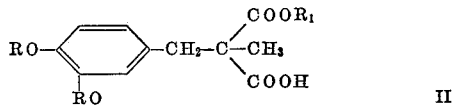

in which R represents the methyl radical and $R_1$ represents the methyl, n-butyl or benzyl radical, and, if $R_1$ stands for the methyl radical, R may also represent the benzyl or the allyl radical, is resolved into its optical isomers by means of optically active bases. Subsequently, (A) the D-compound of the Formula II obtained in this manner is converted into an optically inactive di-ester of the general Formula III

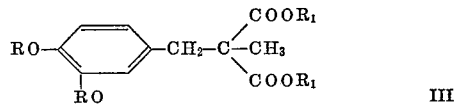

in which R and $R_1$ have the meanings given above, but the two radicals $R_1$ are identical, by esterification with a corresponding alcohol of the formula $R_1OH$ or its reactive derivatives and said di-ester is converted into a starting compound of the general Formula II by hydrolizing one of the ester groups. (B) the L-compound of the Formula II in which R represents the methyl or the benzyl radical, is converted either:

(a) Into a L-isocyanate of the general Formula IV

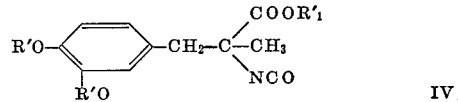

if desired into a L-isocyanate capable of being isolated, and subsequently into a L-compound of the general formula

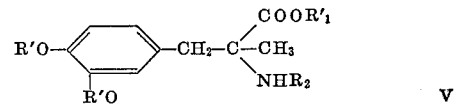

in which R' represents the methyl radical and $R'_1$ represents the methyl, n-butyl or benzyl radical and, if $R'_1$ stands for the methyl radical, R' may also represent the benzyl radical, and $R_2$ stands for a hydrogen atom, an acyl group or a carbalkoxy radical. The radical R' of the ether groups R'—O—, together with the radical $R'_1$ of the ester group, and any N-acyl or N-carbalkoxy group which may be present, are split off by the action of strong acids, if desired without isolation of the compound V. Alternatively, L-compounds of the Formula VI or VII

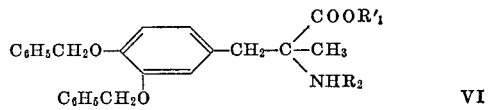

or

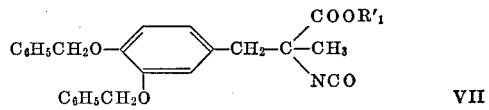

are converted by hydrolysis into the compound of the Formula VIII

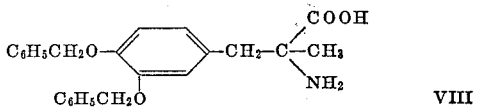

and the benzyl group is split off by catalytic hydrogenation.

(b) The L-compound of the Formula II in which R represents the allyl radical is catalytically hydrogenated and the L-compound of the Formula IX obtained in this manner

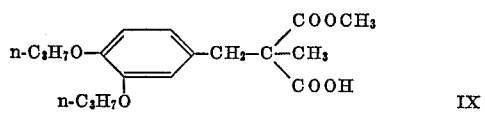
                                                    IX is converted into a L-compound of the general Formula X

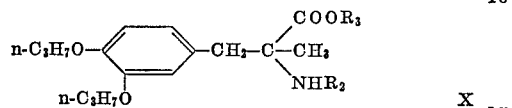
                                                    X in which $R_2$ has the meaning given above and $R_3$ represents a hydrogen atom or a methyl group. The propyl groups are split off, together with any methyl and/or acyl or carbalkoxy group which may be present in an ester linkage, by the action of strong hydrohalic acids, if desired without isolation of the compound X. Alternatively:

(c) The L-compound of the Formula II, in which R represents the allyl radical, is converted into a compound of the general Formula XI

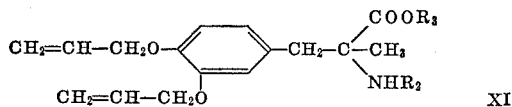
                                                    XI in which $R_2$ and $R_3$ have the meanings given above and said Compound XI:

(1) Is treated with hydrohalic acids, or (2) Is catalytically hydrogenated and the compound of the Formula X obtained in this manner is treated with strong hydrohalic acids, or (3) One allyl group is split off, together with any methyl and/or acyl or carbalkoxy group which may be present in an ester linkage, by the action of an alkali metal hydroxide, and the compound of the Formula XII obtained in this manner

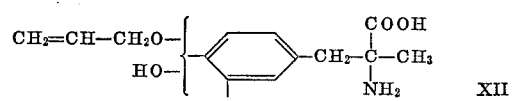
                                                    XII ($\alpha$) Is treated with hydrohalic acids, or ($\beta$) Is catalytically hydrogenated and the compound of the Formula XIII obtained in this manner

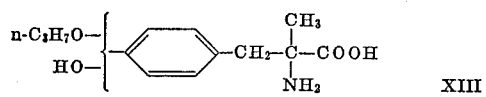
                                                    XIII is subsequently treated with strong hydrohalic acids.

A particular advantage of the process of the present invention is the simple conversion of the D-malonic acid ester of the Formula II into the corresponding di-ester of the Formula III by esterification. The said symmetrical and therefore optically inactive di-ester is reconverted to a starting compound of the general Formula II by hydrolysis of one of the ester groups. Thus, the starting substance is fully used by a simple reaction of esterification and of hydrolysis.

The process for preparing L-α-methyl-DOPA according to the present invention is surprising. It has been found that in the racemate resolution of the methyl-(3,4-dimethoxybenzyl)-malonic acid mono-ethyl or mono-propyl ester with quinine, a sparingly soluble quinine salt in D-configuration crystallizes from the solution, whereas when starting from semi-esters of the general Formula II, the sparingly soluble quinine salt having the desired L-configuration crystallizes from the solution in a practically isomer-free form and needs no further purification by solution and recrystallization.

The di-esters of the Formula III used for preparing the starting substances of the general Formula II may be advantageously obtained by known synthesis involving condensation of the corresponding malonic esters of the formula

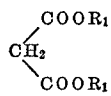

with 3,4-dihydroxybenzaldehyde, which may be methylated previously in 3- and/or in 4-position, with subsequent hydrogenation and C-methylation of the condensation product obtained of the formula

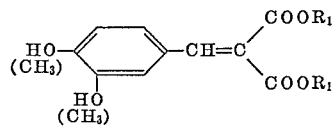

If substituents other than methoxy groups are desired. In the 3- and 4-position of the phenyl radical, these are introduced, for example, by allylation or benzylation after the double linkage has been hydrogenated. The di-benzyl esters and the di-n-butyl esters ($R_1$=benzyl or n-butyl) are prepared in known manner by esterification of the corresponding malonic acid with n-butanol or benzyl-alcohol. They may also be obtained by reesterification, for instance, from (3,4-dimethoxybenzyl)-metyl-malonic acid dimethyl ester. Said reesterification is carried out in the usual manner, preferably by using catalytic quantities of an alkali metal or alkaline earth metal alcoholate and an excess of the alcohol required, at room temperature or at elevated temperatures. A particularly advantageous method of preparing the starting substances of the general Formula III in which R represents the methyl group, is by reaction of the malonic ester with veratrylchloride, by which the 3,4-dimethoxy-benzylmalonic ester is obtained, the carbon atom of which is subsequently methylated. These two reactions may also be carried out in a reversed order, i.e. the C-methylation is carried out prior to the condensation with veratrylchloride.

The hydrolysis of one of the ester groups of the di-ester of the Formula III is brought about by adding an equivalent amount of an alkali metal hydroxide or alkaline earth metal hydroxide, preferably sodium or potassium hydroxide, to an alcoholic solution of the di-ester. If one of the ester groups of the dimethyl ester is to be hydrolized, it is furthermore possible to add a calculated amount of water to a solution of the dimethyl-ester of the Formula III ($R_1$=$CH_3$) in a methanolic solution of sodium methylate. The hydrolysis of one of the ester groups is effected at a temperature in the range of 10° to 70° C. within a period of time of from 30 minutes to 15 hours. At lower temperatures such as room temperature, a longer period of time is necessary, whereas at a temperature of between 40° and 70° C., the hydrolysis of one of the ester groups is complete within a short time. For working up, the solvent is distilled off, the residue is combined with water and the reaction product is set free by acidification with a strong mineral acid. The semi-ester of the Formula II may be filtered off or extracted with a solvent which is not miscible with water.

If one of the ester groups of the di-benzyl ester of the di-butyl ester of the Formula III ($R_1$=benzyl or butyl) is to be hydrolized, benzyl alcohol or n-butyl alcohol is preferred as the alcohol used for this alcoholic solution, but lower aliphatic alcohols such as methanol, ethanol, etc., or their mixtures with one another or with n-butanol or benzylalcohol, may also be used.

The semi-ester of the Formula II has an asymmetric carbon atom and therefore may be resolved into its optical isomers by salt formation with optically active bases. As bases there are mentioned, for example, alkaloids such as quinine, quinidine, cinchonine, cinchonidine, brucine, morphine, strychnine. The resolution can also be brought about with α-phenylethylamine, menthylamine or 2- (or 3-) dimethylamino-4,4-diphenylheptanone-(5).

Preferably, however, the resolution of the racemate is effected with quinine. For this purpose, solutions of equimolar amounts of the D,L-semi-ester of the Formula II and of quinine are mixed, and the quinine salt of the semi-ester which has precipitated after several hours' standing is then filtered off. It is possible and advantageous to replace one-half of the equivalent amount of quinine required for complete salt formation by a corresponding amount of a low molecular weight optically inactive inorganic or organic base such as sodium hydroxide, potassium hydroxide, ammonia, triethylamine, butylamine or morpholine.

As solvents for the salt precipitation, mainly anhydrous or aqueous lower alcohols as well as aqueous lower ketones, especially aqueous mixtures of methanol, ethanol or acetone and of isopropanol or methylethyl ketone may be used. The content of water may be in the range of from 5 to 95 percent.

This quinine salt may also be obtained by adding one half of the equivalent amount of quinine to a solution of unisolated alkali salt of the semi-ester of the Formula II and then neutralizing the alkaline solution by adding one half of the equivalent amount of a dilute aqueous acid such as hydrochloric acid, hydrobromic acid, nitric acid or acetic acid.

The quinine salt of the L-semi-ester of the Formula II is suspended in water and combined, while stirring, with a slight excess of an acid such as hydrochloric acid, hydrobromic acid, nitric acid or acetic acid, whereupon the L-semi-ester of the Formula II is obtained in a practically isomer-free form. After filtration with suction or extraction with a solvent which is not miscible with water, the quinine is precipitated from the aqueous phase by adding an excess amount of a base, for example, an alkali metal hydroxide, and may thus be recovered.

Another possibility for resolving the salt consists in first precipitating the quinine from an aqueous suspension of the salt by means of an alkali metal hydroxide and filtering it off with suction or extracting it by means of an organic solvent which is not miscible with water. Optically pure L-semi-ester of the Formula II is then set free from the alkaline solution by addition of an acid and isolated by extraction or by filtration with suction.

The major part of the organic solvent remaining behind in the filtrate of the precipitate of quinine salt is removed by distillation and the enriched D-semi-ester of the Formula II is isolated from the aqueous phase in the manner described for the quinine salt of the L-semi-ester.

(A) The undesired isomer of the D-series thus obtained can be reconverted in simple manner by esterification into the symmetrical and thus optically inactive diester of the Formula III. The esterification is effected in a manner known as such. The dimethyl-ester ($R_1=CH_3$) is prepared, for example, by treating the semi-ester enriched with D-form in a methanolic solution with acids such as hydrochloric acid, sulfuric acid or toluenesulfonic acid. The water formed during the esterification can be removed, if desired, by addition of a solvent which is not miscible with water and has a lower boiling point than methanol, for example chloroform or methylene chloride.

It is also possible to add a dilute aqueous or aqueous methanolic solution or suspension of an alkali metal or alkaline earth metal hydroxide or carbonate to the optically active semi-ester and to carry out the reaction, with precaution, at temperatures in the range of from 20° to 70° C., with a methylating agent such as dimethyl sulfate, methyltoluene sulfonate, methyl chloride, methyl bromide or methyl iodide, if required under pressure. Methylation with diazomethane also gives a dimethyl ester having the Formula III.

The optically inactive dimethyl-ester of the Formula III ($R_1=CH_3$) thus prepared is obtained in crystalline form, if required, after removal of the organic solvent by distillation, and is then directly subjected again to hydrolysis of one of its ester groups.

In the case of $R_1$ being benzyl or n-butyl in the D-compound of the Formula II, esterification is effected in a known manner by treating the semi-ester enriched with D-form, in a solution of the alcohol required, with acids such as hydrochloric acid, sulfuric acid or toluenesulfonic acid. The water formed by the esterification can be removed azeotropically, if desired, by addition of a solvent which is not miscible with water, such as chloroform or methylene chloride.

(B) As indicated under (a) the L-semi-ester of the Formula II is then converted into compounds of the Formula V by way of an intermediarily formed isocyanate of the general Formula IV, which can be isolated if desired.

This exchange of an amine group for a carboxy group, with retention of optical activity, is carried out particularly suitably by thermolysis of the carboxylic acid azide. The azide may be obtained either from the semi-ester of the Formula II by reaction with inorganic acid chlorides such as thionyl chloride, phosphorus trichloride or phosphoroxy chloride, and subsequent reaction of the carboxylic acid chloride with an alkali azide, or in a particularly advantageous and preserving manner by treatment of the trialkyl-ammonium salt of the L-semi-ester of the Formula II with a chloroformic acid alkyl ester and subsequently with an alkali azide.

The optically active carboxylic acid azide thus obtained can be subjected to thermolysis, without danger and under good control, because of its relatively low nitrogen content. For this purpose, the azide is introduced into a preheated solvent and heated until the evolution of gas ceases. As solvents, lower alcohols such as methanol, ethanol, propanol or butanol, furthermore acetic acid, hydrochloric acid, hydrobromic acid, benzene, toluene, xylene, chlorobenzene, nitrobenzene or mixtures thereof are suitable. Furthermore, it is also possible to dissolve the carboxylic acid azide at room temperature in one of the solvents mentioned and to heat the whole slowly.

A slight evolution of gas indicates that the desired reaction proceeds even at room temperature, but it is preferable to accelerate the reaction by heating to a temperature in the range of 50° to 130° C.

The isocyanate of the general Formula IV formed by using benzene, toluene, xylene, chlorobenzene or nitrobenzene or mixtures thereof can be converted with lower alcohols into a L-compound of the general Formula V in which $R_2$ represents a carbalkoxy radical. With organic acids, preferably acetic acid, an L-compound of the general Formula V in which $R_2$ represents an acyl radical, is obtained from the isocyanate of the general Formula IV. If, however the isocyanate of the general Formula IV is reacted with inorganic acids, L-compounds of the Formula V in which $R_2$ represents a hydrogen atom are generally obtained. The intermediate products of the general Formula V thus obtained are converted into the product of the Formula I by hydrolysis as described below.

The carbamic acid ester of the general Formula V ($R_2$=COO alkyl) formed by the degradation of the azide with the use of lower alcohols, is then directly subjected to further hydrolysis, if desired, in the form of the residue obtained upon removal of the solvent by distillation. This reaction can be carried out by heating the carbamic acid ester for several hours in a strong aqueous or alcoholic solution of an alkali metal hydroxide. After acidification with concentrated hydrochloric acid and removal of the solvent by distillation, the hydrochloride can be separated from inorganic salts by extraction of the residue with lower alcohols. If R stands for the methyl radical, the hydrochloride of L-3,4-dimethoxy-phenyl-α- methyl-alanine is obtained in pure state after concentration of the alcoholic solution and addition of acetone.

A preferred process for preparing this last-mentioned hydrochloride consists in hydrolizing the above-mentioned carbamic acid ester with concentrated aqueous or aqueous-alcoholic hydrochloric acid. The solution obtained is concentrated by evaporation and the residue is again washed with acetone.

Another advantageous possibility for obtaining 3,4-dimethoxy-phenyl - $\alpha$ - methyl-alanine-hydrochloride consists in carrying out the degradation of the azide in hot hydrochloric acid. The working up is like that used in the acid hydrolysis.

The particular advantage of the isolation of 3,4-dimethoxy-phenyl - $\alpha$ - methyl-alanine-hydrochloride as an intermediate product is based on its insolubility in acetone and its difficult solubility in water, furthermore, on its pronounced tendency to crystallization and its good filtering properties. Even when exposed to air, it can be stored without time limit and it does not tend to absorb moisture.

If glacial acetic acid is used in the azide degradation, the first formed N-acetylamino acid methyl ester of the general Formula V ($R_2$=COCH$_3$) can advantageously be directly further reacted, at elevated temperature without isolation, by a treatment with moderately concentrated hydrochloric acid (of about 15 to 25 percent strength), to form the hydrochloride of 3,4-dihydroxy-phenyl-$\alpha$-methyl-alanine correspondingly substituted at the OH-groups.

In order to split off the O-methyl or O-benzyl groups, the hydrochloride of 3,4-dimethoxy- or 3,4-dibenzyloxy-$\alpha$-methyl-phenyl-alanine is treated in a known manner by heating with concentrated aqueous hydrohalic acid or pyridine salts thereof, preferably with concentrated aqueous hydrobromic acid, if desired under pressure. To prevent autoxidation it is advisable to operate in the presence of an inert gas such as nitrogen or carbon dioxide. When the reaction is complete, the product of the present invention is obtained, if desired after concentration of the solution, by neutralizing with dilute aqueous bases such as sodium hydroxide, potassium hydroxide, ammonia or triethylamine. After cooling, the product of the invention is isolated by filtration with suction.

The product of the invention may also be obtained by carrying out the above-described treatment with hydrobromic acid on an intermediate product of the general Formula V. Furthermore, it is possible to carry out the azide degradation in concentrated hydrobromic acid and to boil the reaction solution for several hours after the evolution of gas has ceased. In these methods the product of the invention is advantageously obtained in a single operation.

A particularly advantageous method of converting the 3,4-dibenzyl-phenyl - $\alpha$ - methyl-alanine into L-(−)-3,4-dihydroxy-phenyl-$\alpha$-methyl-alanine according to the process of the invention consists in splitting off the benzyl groups by catalytic hydrogenation. The splitting off is effected in a known manner in the presence of a catalyst of Group VIII of the Periodic System, such as palladium or platinum, or an active Raney-catalyst such as Raney-nickel or Raney-cobalt. The hydrogenation is carried out in a solvent, for example, in lower aliphatic alcohols such as methanol, ethanol, or isopropanol, or in glacial acetic acid. It is possible to carry out the hydrogenation in a shaking device at room temperature or at elevated temperatures of up to about 80° to 100° C., depending on the solvent. The splitting off of the benzyl by hydrogenation may be also carried out in a pressure vessel.

After removal of the catalyst by filtration and concentration of the solvent, the product of the invention is directly obtained in the form of a hydrochloride, if the dibenzyloxy-compound used was in the form of a hydrochloride. It may then be neutralized with alkali, ammonia or triethylamine and isolated by filtration with suction.

If R stands for the allyl radical in the compounds of the general Formula II, the L-compound of the general Formula II may be converted into the product of the invention by a variety of methods and/or sequences of reaction stages.

According to the method indicated under (b), the L-semiester of the Formula II is converted into the L-3,4-dipropyloxy-benzyl-methyl-malonic acid mono-methyl-ester of the Formula IX by catalytic hydrogenation. The catalytic hydrogenation of the allyl groups is effected in a known manner in the presence of a catalyst of Group VIII of the Periodic System, such as palladium or platinum, or of an active Raney-catalyst such as Raney-nickel or Raney-cobalt. The hydrogenation is carried out in a solvent, for example, lower aliphatic alcohols such as methanol, ethanol, or isopropanol, or in glacial acetic acid or dioxane. It is also possible to carry out the hydrogenation in a shaking device at room temperature or at elevated temperatures of up to about 80° to 100° C., if required also under pressure. After removal of the catalyst by filtration and concentration of the solvent, the optically active semi-ester of Formula IX is obtained and is converted into the product of the invention.

This conversion is effected, for example, by conversion of an L-semiester of the Formula IX into a compound of the Formula X, via an isocyanate intermediate, by replacement of the carboxy group with an amino group in the manner described above for the preparation of compounds of the Formula V.

The compound X ($R_2$ and $R_3$=H) may be treated, as described above for the compounds of Formula V, by heating with concentrated aqueous hydrohalic acids, preferably with concentrated aqueous hydrobromic acid, if desired under pressure, while the propyl radicals are split off from the propoxy groups.

According to the method mentioned under (c), the L-compound of Formula II is first converted into an allyloxyphenyl-alanine derivative of the general Formula XI. This conversion is effected in the above-described manner. The di-allyloxyphenyl-alanine derivative of the Formula XI obtained in this manner may then be converted into the produce of the invention in various manners. As indicated under (c1), compounds of the Formula XI are treated with hydrohalic acid and thus the product of the invention is obtained directly in a single reaction. This treatment with acid is carried out in the manner described for the compounds of the general Formula V.

The compounds of Formula XI may also be converted into compounds of the general Formula X by catalytic hydrogenation according to (c2). The conditions of the hydrogenation correspond to the conditions described above for the hydrogenation of a 3,4-diallyloxy-benzyl-malonic acid semi-ester into the corresponding 3,4-dipropyloxy compound. The compounds of the general Formula X thus obtained are converted into the product of the invention by treatment with acids, as described above.

Finally, it is also possible to split off only one allyl group from compounds of the Formula XI, according to (c3), by treatment with alkali metal hydroxides. At the same time, any methyl or acyl or carbalkoxy group which may be present and which is linked in the form of ester, or these groups together, are split off.

The reaction is carried out under strenuous conditions: the alkali metal hydroxide is used in more than a threefold excess. As a solvent, water or alcohols such as methanol, ethanol, propanol, butanol, amylalcohol, benzylalcohol, glycol, glycerin, propylene-glycol or glycol-monomethyl-ether may be used. The reaction mixture is heated to a temperature in the range of 70° to 150° C. If required, the solvent may be removed by distillation and the residue heated to a temperature in the range of 100° to 160° C. In order to isolate the reaction product, the residue is taken up in water and neutralized with acids. During the operation, the Compound XII precipitates and may be removed by filtration.

The mono-allyloxy-compound of the Formula XII obtained may then be converted into α-methyl-DOPA either by direct acid treatment with hydrohalic acid in the above described manner (method α) or with the aid of a catalyst into the monopropyloxy-compound of the Formula XIII according to the manner described under (β). The propyl group is subsequently split off by the action of strong hydrohalic acids in the manner described for the compounds of the Formula V.

The conversion of the carboxyl group in the L-semi-ester of the Formula II into an amino group substituted by $R_2$ may also be effected by degradation methods other than the azide degradation, for example, by the Hofmann degradation.

For this purpose, the compound of the general Formula II is first converted into an acid chloride. For the conversion into the acid chloride, inorganic acid chlorides such as thionyl chloride, phosphorus trichloride or phosphoroxy chloride are used. The acid chloride thus obtained in the usual manner is converted into the corresponding acid amide by treatment with ammonia. This acid amide is then converted into a compound of the general Formula V, in which $R'_1$ and $R_2$ represent hydrogen atoms, with hypohalogenite according to Hofmann. If R' stands for methyl groups in the compound of the general Formula V, the product of the invention is isolated via the sparingly soluble hydrochloride of 3,4-dimethoxyphenyl-α-methyl-alanine already mentioned.

Owing to the smooth course of the reactions and the easily feasible isomerisation of the D-isomers of the semi-ester of the Formula II resulting from the racemate resolution, the total yields of the process of the invention are considerably higher than the total yields of the known processes.

The advantage of the new process for preparing L-α-methyl-DOPA consists, above all, in obtaining the L-semi-esters of the Formula II directly as sparingly soluble salts in optically pure state and in a good yield by the racemate resolution.

A further purification of the salts by recrystallization is not necessary. The base used for the resolution used can be recovered practically without loss. When decomposing the salts containing the optically active base by means of acids or bases, even in the presence of polar solvents no racemization is observed.

The D-semi-esters can be obtained from the filtrate of the racemate resolution and can be reconverted into the optically inactive di-esters of the Formula III by simple esterification. In contradistinction thereto, according to the known process for the racemate resolution of 3-aryl-2-methyl-2-amino-propionitriles (see Belgian Patent No. 633,417), the compounds of the D-series are precipitated with the aid of natural isomers of optically active acids, which are easily accessible, whereas the desired L-aminonitriles are obtained from the filtrate in an optically impure state. The subsequent purification by recrystallization is an additional stage which causes losses in yield. The liberation of the L-aminonitriles from the salt requires particularly precautionary measures because of the optical lability of the intermediate product.

If, however, the racemate resolution is carried out in a later stage (see German specification 1,171,931, laid open to public inspection), the desired L-compound crystallizes out, but the D-compound obtained as by-product must be reconverted into the arylacetone used as starting substance by a process comprising several stages [J. Org. Chem. 29 (1964) p. 1424].

It is also for the last-mentioned reasons that the total yields of the process of the invention are considerably higher than the total yields of the known processes. Thus, for example, while taking into account the D-monoester recovered according to Example 27, the sequence of reactions according to the Examples 6a, 9a, 26, 39f, 40f (starting from veratryl chloride) as well as according to the Examples 2, 9b, 26, 39f, 40f (starting from vanilline) yields 60% of the theory of the laevo-rotary product of the invention. In contradistinction thereto, the corresponding methods of synthesis which are already known yield the racemic α-methyl-DOPA in a total yield of 32% of the theroy when starting from 3,4-dimethoxy-phenylacetonitrile by way of 3,4-dimethoxy-phenyl-acetone according to J. Amer. Chem. Soc. 77 (1955), p. 700 or in a total yield of 11.2% of the theory by condensation of vanilline with nitroethane by way of methoxy-hydroxyphenylacetone and the corresponding hydantoine according to Belgian Patent No. 603,545 (Examples 1 to 5). The yield is further reduced when resolving the α-methyl-DOPA into its optical isomers.

Another particular advantage of the process is that dimethoxy - phenyl-α-methylalanine-hydrochloride can be easily isolated owing to its insolubility in acetone and its difficult solubility in dilute hydrochloric acid. It has a pronounced tendency to crystallization and good filtering properties. It can be stored without time limit even when exposed to air and does not tend to absorb moisture. Since this substance is directly obtained in pure state, no undesired impurities are carried along when the substance is converted into the final product. Thus the working up is considerably simplified.

The product of the invention has therapeutically valuable properties and may be used in particular as an antihypertonic agent. It can be processed, either in substance or in the form of its salts with physiologically tolerated acids, with the usual pharmaceutical adjuvants and carriers into tablets or solutions for injections. It can likewise be admixed with other therapeutically valuable substances (for instance diuretics). The following examples serve to illustrate the present invention but they are not intended to limit it thereto.

Example 1.—3,4-dihydroxybenzylidene-malonic acid dimethyl-ester

A mixture of 138 g. of protocatechualdehyde, 145 g. of malonic acid dimethyl-ester, 100 ml. of benzene, 3.4 g. of piperidine and 2.4 g. of glacial acetic acid is heated to a temperature of 140° C. for 10 hours while the water formed is removed by azetotropic distillation. The crystallized 3,4-dihydroxy-benzylidine-malonic acid dimethyl-ester is filtered off from the reaction solution obtained. Dissolved in xylene and recrystallized, the ester melts at 139°–140° C. The yield is 200 grams (79.3% of the theory).

Example 2.—3-methoxy-4-hydroxy-benzylidene-malonic acid dimethyl-ester

A mixture of 152 g. of vanillin, 145 g. of malonic acid dimethyl-ester, 100 ml. of benzene, 3.4 g. of piperidine and 2.4 g. of glacial acetic acid is heated to 140° C. for 8 and a half hours, the water formed being removed by azeotropic distillation. Subsequently, the solvent is distilled off, the residue is mixed while stirring with 165 ml. of carbon tetrachloride and the whole is allowed to stand over night at 0° C. The crystallized substance is filtered off and the mother liquor is concentrated. After having been allowed to stand for a prolonged period of time at a temperature of 0° C., a second crystal fraction is obtained. The total yield is 232 g. (87% of theory) of vanillylidene-malonic acid dimethyl-ester (melting point 91–94° C.).

Example 3.—3,4-dimethoxy-benzylidene-malonic acid dimethyl-ester

A mixture of 166 g. of veratrumaldehyde, 145 g. of malonic acid dimethyl-ester, 100 ml. of benzene, 3.4 g. of piperidine and 2.4 g. of glacial acetic acid is heated under reflux while the water formed is removed azeotropically. After the reaction is complete, the substance is washed with water, the organic phase is dried and concentrated. Melting point: 130°–131° C. (from benzene); yield: 268 g. (95.8% of the theory).

Example 4.—3,4-di-allyloxy-benzyl-malonic acid dimethyl-ester 100 g. of 3,4-dihydroxybenzylidene-malonic acid dimethylester (of Example 1) are hydrogenated in 500 ml. of methanol with Raney-nickel at room temperature and at a pressure of 80 atmospheres. 32 g. of sodium hydroxide are added to the filtered solution under nitrogen. The mixture is heated under reflux and 96 g. of allylbromide are added dropwise within 1 hour. The mixture is boiled for another hour, the solvent is distilled off in vacuo and the residue stirred with 500 ml. of water and 300 ml. of methylene chloride. Subsequently, the organic phase is washed with an ice-cold normal NaOH solution, and then with water and dried with sodium sulfate. After the solvent has been removed by distillation, there remain 88 g. of a yellow oil (66.4% of the theory).

Example 5.—3,4-dibenzyloxy-benzyl-malonic acid dimethyl-ester 100 g. of dihydroxybenzylidene-malonic acid dimethyl-ester (of Example 1) are hydrogenated in 1 liter of methanol with Raney-nickel at room temperature and at a pressure of 80 atmospheres. 32 g. of sodium hydroxide are added to the filtered solution under nitrogen. The mixture is heated under reflux and 136 g. of benzylbromide are added dropwise within 1 hour. The mixture is boiled for another hour, the solvent is distilled off in vacuo and the residue is distributed between 500 ml. of water and 300 ml. of methylene chloride. The organic phase is washed with an ice-cold sodium hydroxide solution, then with water and dried with sodium sulfate. The residue remaining after the solvent has been removed crystallizes slowly. From methanol, the dibenzyloxy-benzylmalonic acid dimethyl-ester is obtained in the form of crystals (melting point 72°–73° C.). The yield is 135 g. (78.3% of the theory).

Example 6.—3,4-dimethoxy-benzyl-malonic acid dimethyl-ester (a) 264 g. of malonic acid dimethyl-ester are added to a solution of 24 g. of sodium in 500 ml. of methanol at room temperature. Subsequently, 186.5 g. of veratrylchloride are added in portions. The substance is allowed to stand overnight, then the solvent is removed, the residue is distributed between water and methylenechloride, the organic phase is washed with water and dried, and the solvent is removed. By distillation there are obtained 222 g. of 3,4-dimethoxybenzyl-malonic acid dimethyl-ester (79% of the theory) (boiling point: 141° C.) under a pressure of 0.01 mm. of mercury (melting point 70°–71° C. (from cyclohexane)).

(b) 268 g. of 3,4-dimethoxybenzylidene-malonic acid dimethyl-ester (of Example 3) are dissolved in 1 l. of methanol and hydrogenated with Raney-nickel at room temperature at a pressure of 50 atmospheres. Subsequently, the catalyst is filtered off and the solution is concentrated by evaporation. The residue crystallizes. (Melting point: 70°–71° C. (from cyclohexane), yield: 270 g. (100% of the theory)).

(c) 232 g. of 3-methoxy-4-hydroxy-benzylidene-malonic acid dimethyl-ester (of Example 2) are dissolved in 1 l. of methanol and hydrogenated with Raney-nickel at room temperature at a pressure of 100 atmospheres. Subsequently, the catalyst is filtered off, a mixture of 35 g. of NaOH and 350 ml. of methanol is added to the solution and then 110 g. of dimethyl-sulfate are added dropwise at a temperature of 35°–40° C. After having been allowed to stand overnight, the solvent is distilled off, the residue is distributed between water and methylene chloride, the organic phase is washed with an ice-cold normal NaOH soltuion, then with water, dried and concentrated. The residue crystallizes. Melting point: 70°–71° C. (from cyclohexane), yield: 231 g. (94% of the theory).

Example 7.—3,4-diallyloxybenzyl-methyl-malonic acid dimethyl-ester 146 g. of 3,4-diallyloxybenzyl-malonic acid dimethyl-ester (of Example 4) are dissolved in 1 l. of absolute methanol and added to a solution of 11 g. of sodium in 200 ml. of absolute methanol. 70 g. of methyliodide are added and the mixture is heated under reflux for 2 hours. Then the solvent is removed, the residue is distributed between 500 ml. of methylene chloride and 700 ml. of water, the organic phase is separated, washed with water and dried with sodium sulfate. After the solvent has been removed, 129 g. of 3,4-diallyl-oxybenzyl-methyl-malonic acid dimethyl-ester are left in the form of an oily residue (84.7% of the theory).

Example 8.—3,4-dibenzyloxybenzyl-methyl-malonic acid dimethyl-ester 190 g. of 3,4-dibenzyloxybenzyl-malonic acid dimethyl-ester (of Example 5) are dissolved in 1 l. of absolute methanol and added to a solution of 11 g. of sodium in 200 ml. of absolute methanol. 70 g. of methyliodide are added and the mixture is heated under reflux for 2 hours. Subsequently, the solvent is distilled off, the residue is distributed between 500 ml. of methylene-chloride and 700 ml. of water, the organic phase is separated, washed with water and dried with sodium sulfate. After the solvent has been distilled off, an oil which crystallizes slowly is obtained. From methanol dibenzyloxy-benzyl-methyl-malonic acid dimethyl-esters is obtained in the form of prisms (melting point 79°–80° C.) yield: 170 g. (86.7% of the theory).

Example 9.—3,4-dimethoxybenzyl-methyl-malonic acid dimethyl-ester (a) 282 g. of dimethoxybenzyl-malonic acid dimethyl-ester (of Example 6) are added to a solution of 24. g. of sodium in 500 ml. of methanol at room temperature and then 126 g. of dimethylsulfate are added dropwise. After standing overnight the solvent is distilled off, the residue is distributed between methylene chloride and water, the organic phase is washed with water, dried and concentrated. The residue crystallizes. By distillation at the boiling point (145°–150° C. under a pressure of 0.01 mm. of mercury), or by crystallization from cyclohexane 280 g. of 3,4-dimethoxybenzyl-methyl-malonic acid dimethylester are obtained (94.5% of the theory) (melting point: 68°–69° C.).

(b) 266 g. of 3-methoxy-4-hydroxy-benzylidene-malonic acid dimethyl-ester (of Example 2) in 1 l. of methanol are hydrogenated in the presence of Raney-nickel and the crude hydrogenation product is added to a solution of 48 g. of sodium in 1 l. of methanol. 252 g. of dimethylsulfate are added while stirring and the mixture is worked up after standing overnight in the manner described in the foregoing example. 255 g. of 3,4-dimethoxybenzyl-methylmalonic acid dimethyl-ester are obtained (86% of the theory) (melting point: 68°–69° C.).

(c) 146 g. of methyl-malonic acid dimethyl-ester are added to a solution of 24 g. of sodium in 500 ml. of absolute methanol at room temperature. Subsequently 186.5 g. of veratryl chloride are added in portions. The mixture is allowed to stand over-night, the solvent is distilled off, the residue is distributed between water and methylenechloride, the organic phase is washed with water, dried and the solvent is removed. The residue distills at the boiling point (145°–150° C. under a pressure of 0.01 mm. of mercury), the melting point is 68°–69° C. (from cyclohexane), yield: 260 g. (88.2% of the theory).

Example 10.—3,4-dimethoxybenzyl-methyl-malonic acid dibenzyl-ester 296 g. of 3,4-dimethoxybenzyl-methyl-malonic acid dimethyl-ester (of Example 9) are dissolved in 500 ml. of methanol and the mixture is heated under reflux with 220 g. of a 40% sodium hydroxide solution for 2 hours. Subsequently, the solvent is distilled off, the residue is taken up with water, filtered with animal charcoal and adjusted to pH 1 with concentrated hydrochloric acid while stirring. The precipitated substance is filtered with suction, washed with water and dried. There are obtained 263 g. of 3,4-dimethoxybenzyl-methyl-malonic acid (98.2% of the theory) (melting point: 162°–164° C. with decomposition).

268 g. of 3,4 - dimethoxybenzyl-methyl-malonic acid suspended in 750 ml. of benzylalcohol and benzene each, are boiled with 20 g. of p-toluene-sulfonic acid using a water separator. After the reaction is complete the substance is allowed to cool, washed with a sodium bicarbonate solution and water and the benzene as well as the excessive benzylalcohol are distilled off, in the last phase of the distillation in a high vacuum. The residue crystallizes gradually and is mixed while stirring with the same amount of cyclohexane. After filtration and drying, 436 g. of 3,4-dimethoxy-benzyl-methyl-malonic acid dibenzylester are obtained (melting point: 70°–72° C.) (93% of the theory).

Example 11.—3,4-dimethoxybenzyl-methyl-malonic acid di-n-butylester 5.75 g. of sodium are dissolved in 1 l. of absolute n-butanol, 296 g. of 3,4-dimethoxybenzyl-methyl-malonic acid dimethyl-ester (of Example 9) are added and the mixture is heated under reflux for 5 hours. After cooling 14.3 ml. of glacial acetic acid are added and the solvent is distilled off in vacuo. The residue is distributed between methylene chloride and water, the organic phase is washed with water and dried with sodium sulfate. The residue left after the concentration is subjected to fractional distillation. Boiling point: 180°–184° C./0.6. There are obtained 348 g.=91.7% of the theory.

Example 12.—D,L-3,4-di-allyloxybenzyl-benzyl-malonic acid monomethylester 104.5 g. of 3,4-diallyloxybenzyl-methyl-malonic acid dimethylester (of Example 7) are boiled under reflux in 750 ml. of methanol with 150 ml. of 2 N NaOH for 1 hour. After the solvent has been distilled off in vacuo, the residue is dissolved in water, the solution is filtered with charcoal and adjusted to pH 1 with hydrochloric acid. The precipitated oil is taken up in methylene chloride, the solution is washed with water, dried and concentrated by evaporation in vacuo. There are left 81 g. of a light yellow oil (80.9% of the theory).

Example 13.—D,L-3,4-dibenzyloxybenzyl-methyl-malonic acid monomethylester

A solution of 448 g. of 3,4-dibenzyloxybenzyl-methyl-malonic acid dimethylester (of Example 8) in methanol is treated with 66 g. of potassium hydroxide. After standing over-night the solvent is distilled off, the resulting syrup is taken up with water, the solution is extracted with methylene chloride, filtered with charcoal and acidified with concentrated hydrochloric acid. The precipitated oil solidifies within a short period of time. The disintegrated substance weighs 396 g. (91% of the theory) after having been washed with water and dried. (Melting point: 53°–56° C.).

Example 14.—D,L-3,4-dimethoxybenzyl-methyl-malonic acid monomethylester

A solution of 296 g. of 3,4-dimethoxybenzyl-methyl-malonic acid dimethyl-ester (of Example 9) in methanol is treated with 66 g. of potassium hydroxide. After standing over-night the solvent is distilled off, the resulting syrup is taken up with water, the solution is extracted with methylene chloride, filtered with charcoal and acidified with concentrated hydrochloric acid. The precipitated oil solidifies within a short period of time. The disintegrated substance weighs 265 g. (94% of the theory) when washed with water and dried. After dissolution in a mixture of acetone and water and recrystallization, 3,4-dimethoxybenzyl-methyl-malonic acid monomethylester is obtained in the form of thick long needles (melting point: 110°–111° C.).

Example 15.—D,L-3,4-dimethoxybenzyl-methyl-malonic acid monobenzylester 468 g. of 3,4-dimethoxybenzyl-methyl-malonic acid dibenzylester (of Example 10) are dissolved in 2 l. of benzyl-alcohol and allowed to stand overnight with 69 g. of KOH (of 85% strength) in 140 ml. of methanol. Subsequently, the solvent is distilled off in vacuo, the residue is dissolved in water and the solution is extracted with methylene chloride. The aqueous phase is filtered with animal charcoal and adjusted to pH 1 with concentrated hydrochloric acid. The precipitated oil is taken up with methylene chloride, the solution is washed with water, dried and concentrated, towards the end in a high vacuum. The residue crystallizes. 328 g. of 3,4-dimethoxybenzyl-methyl-malonic acid monobenzylester are obtained (89% of the theory) (melting point: 89°–91° C.) (methanol/water).

Example 16.—D,L-3,4-dimethoxybenzyl-methyl-malonic acid mono-n-butylester 380 g. of 3,4-dimethoxybenzyl-methyl-malonic acid di-n-butylester (of Example 11) are dissolved in 2 l. of n-butanol and allowed ot stand overnight with 69 g. of KOH (of 85% strength) in 140 ml. of methanol. Subsequently, the solvent is distilled off in vacuo, the residue is dissolved in water and the solution is extracted with methylene chloride. The aqueous phase is filtered with charcoal and adjusted to pH 1 with concentrated hydrochloric acid. The precipitated oil is introduced into methylene chloride, the organic phase is washed with water, dried and concentrated, towards the end in a high vacuum. There are obtained 290 g. of an oil which is dissolved in 1 l. of ethanol. 170 g. of lead acetate-trihydrate in 85 ml. of glacial acetic acid and 1 l. of water are added to the mixture. The precipitated lead salt is filtered off, washed with cold water and suspended, while stirring, in 600 ml. of carbon tetrachloride when still wet. 1.6 l. of 2 N HNO₃ are added while stirring, the organic phase is separated, the substance is washed with water and the solvent is distilled off after drying—in the last phase of the distillation in a high vacuum. 280 g. (=86.5% of the theory) of a non-crystallizing oil are obtained.

Example 17.—Quinine salt of L-3,4-diallyloxybenzyl-methyl-malonic acid monomethylester 39.7 g. of D,L-3,4-diallyloxybenzyl-methyl-manolic acid monomethylester (of Example 12) are dissolved with 31 ml. of 2 N NaOH and 20.1 g. of quinine in methanol. Water is added to the mixture which is kept in the refrigerator at +4° C. Subsequently, the crystals are filtered off, washed with a small amount of methanol/water (1+1) and dried. The substance weighs 31.2 g. (81% of the theory), (melting point: 138° C.).

The mother liquor is concentrated in vacuo, the residue is distributed between 2 N HCl and methylenechloride, the organic phase is separated, dried and concentrated by evaporation. The residue weighs 23 grams.

Example 18.—Reesterification of D-3,4-diallyloxybenzyl-methyl-malonic acid monomethylester The 23 g. of the residue obtained according to Example 17 are dissolved in 36 ml. of 2 N NaOH and treated dropwise with 13.7 g. of dimethyl sulfate at 45°–50° C. Subsequently, 12.5 g. of potassium carbonate are added. After another addition of 13.7 g. of dimethyl sulfate the substance is stirred for 30 minutes on the steam bath. After cooling the substance is extracted with ether, the organic phase is washed with normal NaOH, then with water, dried and concentrated. The yield is 20.2 g. of dimethylester=84.5% of the theory.

Example 19.—L-3,4-di-allyloxybenzyl-methyl-malonic acid monomethylester 104 g. of the quinine salt obtained according to Example 17 are shaken with 500 ml. of 2 N HCl and 500 ml. of ether, the phases are separated, the aqueous solution is once more extracted with ether and the combined etheric solutions are dried. After the ether has been filtered off, 50.7 g. of L-3,4-di-allyloxybenzyl-methylmalonic acid monomethylester are left as residue (98.6% of the theory).

Example 20.—L-3,4-di-propyloxybenzyl-methyl-malonic acid monomethylester 73.5 g. of L-3,4-diallyloxybenzyl-methyl-malonic acid monomethylester (of Example 19) in 50 ml. of dioxane are hydrogenated with palladium as catalyst at room temperature and normal atmospheric pressure. The solution is filtered and concentrated by evaporation in vacuo. 72 g. (96.8% of theory) of L-3,4-dipropyloxybenzyl-methyl-malonic acid monomethyl ester are obtained as a residue.

Example 21.—L-3,4-di-benzyloxybenzyl-methylmalonic acid monomethylester 87 g. of D,L-3,4-dibenzyloxybenzyl-methyl-malonic acid monomethylester (of Example 13) and 32.4 g. of quinine are dissolved in methanol and 50 ml. of 2 N NaOH are added to the filtered solution. After a period of 2 hours the crystallisation which sets in immediately is complete. The quinine salt is filtered off, the substance is washed with methanol/water then with water. The salt, which is still wet, is suspended in water and concentrated hydrochloric acid is added dropwise while stirring. The L-3,4-dibenzyl-hydroxybenzyl-methyl-malonic acid monomethylester crystallizes. It is filtered off after 1 hour and washed with water. When dried the substance weighs 37 grams (42.5% of the racemate used, corresponding to 85% of the theory).

The mother liquor of the quinine salt crystallisation is concentrated in vacuo and the residue is distributed between 2 N HCl and methylenechloride. The organic phase is dried and concentrated. The residue weighs 47 grams.

Example 22.—Re-esterification of D-3,4-di-benzyloxybenzyl-methyl-malonic acid monomethylester The 47 g. of the residue obtained according to Example 21 are stirred with 54 ml. of 2 N NaOH and treated with 20 g. of dimethylsulfate at 40° C. Subsequently, 19 g. of potassium carbonate and another portion of 20 g. of dimethylsulfate are added and stirred on the steam bath for 30 minutes. After cooling, the substance is extracted with methylenechloride, the organic phase is washed with a cold normal NaOH solution, then with water, dried and concentrated. The residue crystalizes slowly. Melting point: 79°–80° (from methanol). The yield is 46 g. of dimethylester=51.2% of the theory, calculated on the monoester used for the racemate resolution.

Example 23.—L-3,4-dimethoxybenzyl-methyl-malonic acid monomethylester 55.4 g. of D,L-3,4-dimethoxybenzyl-methyl-malonic acid monomethylester (of Erample 14) and 32.4 g. of quinine are dissolved in methanol and 50 ml. of 2 N NaOH are added to the filtered solution. After a period of 2 hours the crystallization which starts at once is complete. The quinine salt is filtered off, washed with a mixture of methanol and water, then with water. The salt which is still wet is suspended in water, and concentrated hydrochloric acid is added dropwise while stirring until a pH-value of 1 is reached. The L-3,4-dimethoxybenzyl-methyl-malonic acid monomethylester crystallizes at once. It is filtered off after 1 hour and washed with water. When dried the substance weighs 23.3 g. (41.5% of the racemate used, corresponding to 83% of the theory).

Example 24.—Recovery of the splitting base

The mother liquor and the wash water (of Example 23) are combined and carefully concentrated, methylene chloride and hydrochloric acid are added and the phases are separated. 31 g. (96% of theory) of quinine (melting point: 173° C.) are obtained from the aqueous solutions by adding sodium hydroxide solution, filtering, washing, and drying.

Example 25.—Re-esterification of D-3,4-dimethoxybenzyl-methyl-malonic acid monomethylester with dimethylsulfate From the methylenechloride solution of Example 24 there are left, after concentration, 31.5 g. of an oily 3,4-dimethoxybenzyl-methyl-malonic acid monomethylester, which is enriched with D-form and crystallizes after a certain period of time. 2 N NaOH is added while stirring until pH 8 is reached. Subsequently, 24 g. of dimethylsulfate are added in the course of 1 hour and 2 N NaOH is added in intervals until pH 8 is reached. The 3,4-dimethoxybenzyl-methyl-malonic acid dimethylester precipitating first as an oily substance, crystallizes. It is stirred for 2 hours with distilled water, filtered off and dried, and melts at 66°–68° C. The yield is 31 g. (52.4% of the theory, calculated on the monoester used for the racemate resolution in Example 23).

Example 26.—L-3,4-dimethoxybenzyl-methyl monoacid monomethylester without isolation of D,L-3,4-dimethoxybenzyl-methyl-malonic acid monomethylester A solution of 296 g. of 3,4-dimethoxybenzyl-methyl-malonic acid dimethylester of Example 9 in methanol is heated under reflux for 1 hour with 66 g. of KOH (of 85% strength). After cooling down to 40° C., 162 g. of quinine are added. Subsequently, 30 g. of glacial acetic acid and water are added until crystallization sets in. The substance is placed in ice for 2 hours, filtered off, the precipitate is washed with methanol/water, then with water, and suspended in water. Concentrated hydrochloric acid is added while stirring until pH 1 is reached, the substance is stirred for 1 hour at 0° C., and filtered off. It is washed with water and weighs, when dried, 119 g. (42.2% of the substance used=84.4% of the theory). Melting point: 110°–111° C.

Example 27.—Re-esterification of D-3,4-dimethoxybenzyl-methyl-malonic acid monomethylester with methanol/HCl Mother liquors and wash water of Example 26 are combined and concentrated in vacuo. The residue is stirred with methylenechloride and 2 N HCl. The separated organic phase is washed with water (wash water and aqueous phase are used further for obtaining quinine as described in Example 24), dried and liberated from the solvent in vacuo. The residue is dissolved in 800 ml. of methanol and the mixture is heated to boiling for 2 hours with 200 ml. of methanolic hydrochloric acid. After standing over-night, the solvent is distilled off. The residue crystallizes. Melting point 68° C. (from cyclohexane); yield: 160 g. (54.1% of the theory, calculated on the amount of dimethylester used in Example 26).

Example 28.—Quinine salt of L-3,4-dimethoxybenzyl-methyl-malonic acid monobenzylester 358 g. of the semi-ester prepared according to Example 15 are dissolved with 162 g. of quinine in 600 ml. of methanol. The mixture is filtered with charcoal, diluted with 350 ml. of water and adjusted to pH 6 with about 250 ml. of 2 N NaOH. The crystallization which starts after a short period of time is complete after 2 hours at 0° C. The substance is filtered with quick suction, washed with aqueous methanol of 10% strength and dried. Yield: 94%, melting point: 128°–132° C.

Example 29.—L-3,4-dimethoxybenzyl-methyl-malonic acid monobenzylester

The quinine salt of Example 28 is suspended in water and concentrated hydrochloric acid is added dropwise while stirring until pH 1 is reached. The precipitated solid substance is filtered with suction, washed with water and dried in vacuo over $P_2O_5$. The L-3,4-dimethoxybenzyl-methyl-malonic acid monobenzylester (melting point 89°–91° C.) is obtained in a yield of 97.8%.

Example 30.—Re-esterification of D-3,4-dimethoxybenzyl-methyl-malonic acid monobenzylester The mother liquor obtained according to Example 28 is liberated from the organic solvent in vacuo, adjusted to pH 1 with concentrated hydrochloric acid and extracted with methylenechloride. The residue left after the solvent has been distilled off is dissolved in 700 ml. of benzylalcohol and the solution saturated with gaseous hydrochloric acid is allowed to stand over-night. Subsequently, the solvent is distilled off and the residue, dissolved in methylenechloride, is washed with a sodium bi-carbonate solution and water. After concentration, towards the end in a high vacuum, there are obtained 222 g. of 3,4-dimethoxybenzyl-methyl-malonic acid di-benzylester which is subjected to hydrolysis of one of the ester groups (48.5% of the theory, calculated on the amount of D,L-3,4-dimethoxybenzyl-methyl-malonic acid monobenzylester used in Example 28), melting point: 70°–72° C. (from cyclohexane).

Example 31.—Quinine salt of L-3,4-dimethoxybenzyl-methyl-malonic acid mono-n-butylester 324 g. of the semi-ester prepared according to Example 16 are dissolved with 162 g. of quinine in 600 ml. of methanol. The mixture is filtered with charcoal, diluted with 350 ml. of water and dajusted to pH 6 with about 250 ml. of 2 N NaOH. The crystallization which starts after a short period of time is complete after 2 hours at 0° C. The substance is filtered with quick suction, washed with aqueous methanol of 10% strength and dried. Melting point 132°–135° C., yield 84%.

Example 32.—L-3,4-dimethoxybenzyl-methyl-malonic acid mono-n-butylester

The quinine salt of Example 31 is suspended in water and concentrated hydrochloric acid is added dropwise, while stirring, until pH 1 is reached. The oily semi-ester is extracted with methylene chloride, the solution is washed with water, dried and concentrated. A non-crystallizing oil is obtained in a yield of 97%.

Example 33.—Re-esterification of D-3,4-dimethoxybenzyl-methyl-malonic acid mono-n-butylester The mother liquor obtained according to Example 31 is liberated from the organic solvent in vacuo, adjusted to pH 1 with concentrated hydrochloric acid and extracted with methylene chloride. The residue left after the solvent has been distilled off is dissolved in 500 ml. of n-butanol and the solution saturated with gaseous hydrochloric acid is allowed to stand over-night. Subsequently, the solvent is distilled off and the residue, dissolved in methylenechloride, is washed with a sodium bi-carbonate solution and water. After concentration, which is effected towards the end in a high vacuum, there are obtained 202 g. of 3,4-dimethoxybenzyl-methyl-malonic acid di-n-butylester which is used again for the hydrolysis of one of the ester groups (53.2% of the theory, calculated on the amount of D,L-3,4-dimethoxybenzyl-methyl-malonic acid mono-n-butylester used in Example 31).

Example 34.—L-3,4-dimethoxybenzyl-methyl-malonic acid mono-methylester azide 130 g. of L-3,4-dimethoxybenzyl-methyl-malonic acid monomethylester of Example 23 are dissolved in 200 ml. of acetone and treated at 0° C. first with 31 g. of triethylamine in 250 ml. of acetone, then with 62 g. of chloroformic acid ethylester in 100 ml. of acetone and finally, after stirring for ¾ hour, with 43 g. of sodium azide in 130 ml. of water. Stirring is continued for 90 minutes, then the whole is poured into ice water, extracted with methylene chloride, the organic phase is separated and the substance is dried. The carboxylic acid azide of the monomethylester is obtained as an oily residue by distillation of the solvent in vacuo at the lowest possible temperature. The yield is 135 g. (95.5% of the theory).

Example 35.—L-3,4-dimethoxybenzyl-methyl-malonic acid monomethylester azide 141 g. of L-3,4-dimethoxybenzyl-methyl-malonic acid monomethylester of Example 23 and 120 g. of thionylchloride are heated under reflux for 30 minutes in 500 ml. of chloroform. Subsequently, the solvent and the excessive thionylchloride are distilled off, the last phase of the distillation being effected in vacuo, and the residue, dissolved in 250 ml. of dioxane, is added dropwise at 0° C., while stirring, to a saturated aqueous solution containing 47 g. of sodium azide. After 2 hours the substance is diluted with 1 l. of water and the mixture is extracted with methylene chloride. The organic phase is washed with water, dried, and concentrated in vacuo after filtering at a bath temperature of 40° C. The azide is obtained in the form of clear oil. Yield: 141.5 g. (92.3% of the theory).

Example 36.—L-1-(3',4'-dimethoxyphenyl)-2-methoxycarbonyl-propyl-(2)-isocyanate (general Formula IV: $R'=R'_1=CH_3$)

135 g. of L-3,4-dimethoxybenzyl-methyl-malonic acid monomethylester azide (of Example 34) are introduced into 300 ml. of anhydrous benzene and added dropwise to 500 ml. of boiling anhydrous benzene. After the addition is complete the whole is heated for another hour and the solvent is then distilled off—the last phase of the distillation being effected in vacuo. The isocyanate is obtained in the form of an oil. Yield: 119 grams (97% of the theory).

Example 37.—L-α-(3,4-dimethoxybenzyl)-α-ethoxycarbonylamino-propionic acid methylester (general Formula V: $R'=R'_1=CH_3$, $R_2=-COOC_2H_5$)

(a) 135 g. of L-3,4-dimethoxybenzyl-methyl-malonic acid monomethylester azide (of Example 34) are introduced into 300 ml. of anhydrous ethanol and added dropwise to 500 ml. of boiling anhydrous ethanol. When the addition is complete the substance is heated for another hour and the solvent is distilled off—the last phase of the distillation being effected in vacuo. The carbamic acid ester is obtained in the form of an oil. Yield: 133 g. (93% of the theory).

(b) 27.9 g. of isocyanate (of Example 36) are boiled for 1 hour with 100 ml. of anhydrous ethanol. After the solvent has been distilled off the carbamic acid ester is obtained in the form of a light oil. Yield: 32 g. (98.4% of the theory).

Example 38.—L-α-(3,4-dimethoxybenzyl)-α-acetylamino-propionic acid methylester (general Formula V: $R'=R'_1=CH_3$, $R_2=-COCH_3$)

(a) 135 g. of L-3,4-dimethoxybenzyl-methyl-malonic acid monomethylester azide (of Example 34) are added dropwise, while stirring, to 500 ml. of glacial acetic acid of 90° C. The reaction which takes place with evolution of nitrogen and carbonic acid is complete within 1 hour. The viscous syrup left after the solvent has been distilled off is directly used further. Yield: 130 grams (87.3% of the theory).

(b) 27.9 g. of isocyanate (of Example 36) are boiled for 1 hour with 100 ml. of glacial acetic acid. The syrup left after the solvent has been distilled off is directly used further. Yield: 31 g. (91.5% of the theory).

Example 39.—L-β-(3,4-dimethoxyphenyl)-α-methyl-alanine-hydrochloride (general Formula V: R'=CH₃, R'₁=R₂=H)

(a) 141 g. of L-3,4-dimethoxybenzyl-methyl-malonic acid monomethylester (of Example 23) are converted into the azide, in the manner described in Example 34. The azide is added dropwise, while stirring, to 400 ml. of a 20% hydrochloric acid at a temperature of 90°–95° C. The oil dissolves with evolution of gas. After having kept the mixture at this temperature for another hour, it is cooled to 0° C., filtered off, washed with acetone and dried in an air current. 125 g. of pure L-β-(3,4-dimethoxyphenyl)-α-methyl-alanine-hydrochloride are obtained in the form of a monohydrate (decomposition point: 160°–163° C.) (85% of the theory).

(b) 141 g. of L-3,4-dimethoxybenzyl-methyl-malonic acid monomethylester prepared according to Example 23 are converted into the carbamic acid ester of the Formula V (R₂=—COOC₂H₅), in the manner described in Example 37(a). The ester is heated under reflux for 8 hours with 500 ml. of a 40% sodium hydroxide solution. After cooling, the lower phase of the hydrolysis mixture is separated and concentrated hydrochloric acid is added to the upper phase until pH 2 is reached. The mixture is stirred with 500 ml. of methylenechloride for 1 hour at room temperature and then is filtered. The filter cake is washed with acetone and dried in an air current. In this manner, there are obtained 109 g. of L-β-(3,4-dimethoxyphenyl)-α-methyl-alanine-hydrochloride in the form of a monohydrate (decomposition point: 161°–163° C.) (74.5% of the theory).

(c) 141 g. of L-3,4-dimethoxybenzyl-methyl-malonic acid monomethylester prepared according to Example 23 are converted into the carbamic acid ester of the Formula V (R₂=COOC₂H₅) in the manner described in Example 37(a). The ester is heated on the steam bath for 5 hours with 420 ml. of a 20% hydrochloric acid. After cooling, the whole is filtered off, washed with acetone and dried in an air current. In this manner there are obtained 119 g. of L - β - (3,4 - dimethoxyphenyl) - α - methyl - alanine-hydrochloride in the form of a monohydrate (point of decomposition: 162°–163° C.) (81% of the theory).

(d) 141 g. of the L-3,4-dimethoxybenzyl-methyl-malonic acid monomethylester of Example 23 are converted into the azide in the manner described in Example 34. The azide is added dropwise to 500 ml. of glacial acetic acid at 90° C. (see Example 38). The reaction proceeds with evolution of nitrogen and carbon dioxide and is terminated within 1 hour. The mixture is concentrated to the thickness of syrup in the water-jet vacuum and the residue is allowed to stand with 400 ml. of 20% hydrochloric acid at a temperature of 90° to 95° C. Within 2 hours the bulk of the hydrochloride has precipitated. In order to complete the crystallization the substance is cooled for 3 hours at 0° C., the crystalline slurry is filtered off, washed with acetone and dried in the air. 107 g. of L-β-(3,4-dimethoxyphenyl)-α-methyl-alanine-hydrochloride are obtained in the form of a monohydrate (melting at 161°–163° C. with decomposition) (73% of the theory).

(e) 141 g. of L-3,4-dimethoxybenzyl-methyl-malonic acid monomethylester of Example 23 are converted into the corresponding azide and, further, into the corresponding isocyanate, as described in Example 34 and 36. The isocyanate is treated on the steam bath with 420 ml. of 20% hydrochloric acid. After cooling, the whole is filtered, washed with acetone and dried in an air current. 120 g. of L - β - (3,4 - dimethoxyphenyl) - α - methyl - alanine - hydrochloride are obtained in the form of a monohydrate melting at 160°–163° C. with decomposition (81.7% of the theory).

(f) 141 g. of L-3,4-dimethoxybenzyl-methyl-malonic acid monomethylester of Example 23 are dried under reflux in 220 ml. of methylenechloride containing 122 g. of thionylchloride. Subsequently, the solvent is distilled off while the excess hydrochloric acid escapes. The residue is taken up with chloroform, and dry gaseous NH₃ is introduced into the solution until the latter is saturated. After the substance has been extracted with water, 250 ml. of water are added to the organic phase, and the whole is concentrated to dryness by evaporation in vacuo. Subsequently, 30 ml. of a 45% sodium hydroxide solution and 250 ml. of water are added at 60°–70° C. When the substance has completely dissolved, 25 ml. of the liquid are distilled off. The filtered solution is cooled to 0° C., and a mixture of 274 g. of bleaching liquor (0.52 mol of NaOCl) and 90 g. of concentrated sodium hydroxide solution are added. The substance is stirred for 3 hours at 0° C. to 10° C., heated to 70° C., and the solution is dropped at 50° C. into 200 g. of concentrated hydrochloric acid. The precipitate is filtered with suction at 5° C., washed with cold water and acetone, and dried in an air current. In this manner, there are obtained 135 g. of L - β - (3,4 - dimethoxyphenyl) - α - methyl - alanine - hydrochloride in the form of a monohydrate, melting at 160°–165° C. with decomposition (92% of the theory).

Example 40.—L-α-methyl-DOPA (a) 282 g. of L-3,4-dimethoxybenzyl-methyl-malonic acid monomethylester of Example 23 are dissolved in 450 ml. of acetone and first a solution of 150 ml. of triethylamine in 550 ml. of acetone and then 125 ml. of chloroformic acid ethylester in 200 ml. of acetone are added while stirring at 0° C. The whole is stirred for another 45 minutes and a solution of 110 g. of sodium azide in 280 ml. of water is added dropwise to the mixture—likewise at 0° C. The whole is then stirred for 90 minutes at 0° C. and the reaction mixture is added to 4 l. of ice water. It is extracted twice with 500 ml. of methylenechloride, then the organic phase is washed with 500 ml. of water and dried.

The residue left after the solvent has been distilled off in vacuo at a bath temperature of 40° C. is added dropwise while vigorously stirring to 1.5 l. of hydrobromic acid of 48% strength at 90°–95° C. under nitrogen. The solution proceeds with evolution of gas. After having been kept for 6 hours at 120° C., the solution is cooled to 70° C. and concentrated to dryness in vacuo. The residue is taken up in 2 l. of water, the pH-value of the solution is adjusted to 6.5 with diethylamine and the solution is saturated with SO₂ while any substance which may have precipitated dissolves again. The substance is filtered with charcoal and the yellow solution is concentrated with a water-jet-vacuum at a bath temperature of 60° C. under nitrogen. When crystallization starts, the substance is placed in ice for 3 hours under nitrogen, then filtered off and washed first with a small amount of ice water and then with acetone. The filtrate and the wash water are combined, treated once more with SO₂ and concentrated. The whole is allowed to stand in ice overnight, filtered off and washed in the manner described above. In this manner, 143 to 162 g. of L-α-methyl-DOPA-sesquihydrate are obtained corresponding to 60–68% of the theory. $[\alpha]_D^{20}$ -4.5° (2%, 0.1 N HCl).

(b) 141 g. of L-3,4-dimethoxybenzyl-methyl-malonic acid (of Example 23) are converted to isocyanate according to Examples 34 and 36. The isocyanate is boiled with 750 ml. of 48% hydrobromic acid for 5 hours under nitrogen. Subsequently, the whole is concentrated to dryness by evaporation in vacuo and the residue is dissolved in water. L-α-methyl-DOPA is isolated in the manner described in the preceding example. Yield: 85 g. (71.5% of the theory). $[\alpha]_D^{20} = 4.5°$ (2%, 0.1 N HCl).

(c) 141 g. of L-3,4-dimethoxybenzyl-methyl-malonic acid monomethylester of Example 23 are converted into the carbamic acid ester (Formula V: R₂=—COOC₂H₅)

according to Examples 34 and 37. Said ester is boiled with 750 ml. of 48% hydrobromic acid for 5 hours under nitrogen. Subsequently, the whole is concentrated by evaporation in vacuo, the residue is dissolved in water and worked-up in the manner described in Example 40(a); yield: 83 g. (69.8% of the theory). $[\alpha]_D^{20} = 4.5°$ (2%, 0.1 N HCl).

(d) 141 g. of L-3,4-dimethoxybenzyl-methyl-malonic acid monomethylester of Example 23 are converted into the acetyl-amino-compound (general Formula V:

$$R_2 = COCH_3)$$

according to Examples 34 and 38. The crude product is boiled with 750 ml. of 48% hydrobromic acid for 5 hours under nitrogen. Subsequently, the whole is concentrated by evaporation in vacuo and the aqueous solution of the residue is worked up to yield L-α-methyl-DOPA, as described in the preceding examples. Yield: 82 g. (68.8% of the theory). $[\alpha]_D^{20} = 4.5°$ (2%, 0.1 N HCl).

(e) 275 g. of L-β-3,4-dimethoxyphenyl-α-methyl-alanine-hydrochloride prepared according to Example 39 are suspended in 1.2 l. of 48% hydrobromic acid while passing through a stream of dry nitrogen and the mixture is heated under reflux. The substance dissolves with evolution of HCl. After a period of 8 hours the light colored mixture is concentrated by evaporation in vacuo under nitrogen, the residue is dissolved in a mixture consisting of water, methanol and acetone, and concentrated ammonia is added while stirring until a pH 6.5 is reached. The mixture is stirred for 3 hours at 0° C., filtered off and the substance is washed with acetone. By recrystallization from water containing $SO_2$, there are obtained after washing with acetone and drying, 140 g. and, after concentration of the mother liquor, another 52 g. of L-α-methyl-DOPA melting at 300° C. (86% of the theory).

$$[\alpha]_D^{20} = 4.5°$$

(2%, 0.1 N hydrochloric acid).

(f) 293 g. of L-β-3,4-dimethoxyphenyl-α-methyl-alanine-hydrochloride of Example 39 are boiled under reflux in 1.5 l. of 48% hydrobromic acid for 5 hours while a stream of dry nitrogen is passed through the mixture. Subsequently, the substance is concentrated to dryness in vacuo, the residue is dissolved in water and the solution is passed over a basic ion-exchanger charged with sulfite ions. The substance is given an after-wash with water until the filtrate drips off in colorless drops. The solution is concentrated in vacuo at a bath temperature of 60° C. When the crystallization starts, the substance is placed in ice for 2 hours, filtered off and washed with a small amount of water and a large amount of acetone. The mother liquor is concentrated further and the crystals precipitated are treated as described above. In this manner, there is obtained a total yield of 226 g. of L-α-methyl-DOPA (95% of the theory). $[\alpha]_D^{20} = 4.4°$ (2%, 0.2 N HCl).

(g) 200 g. of L-3,4-dibenzyloxybenzyl-methyl-malonic acid monomethylester of Example 21 are dissolved in 200 ml. of acetone and treated at 0° C. first with 51 g. of triethylamine in 250 ml. of acetone, then with 62 g. of chloroformic acid ethylester in 100 ml. of acetone, and finally, after stirring for 45 minutes with 43 g. of sodium azide in 130 ml. of water. Stirring is continued for another 90 minutes, the whole is then poured into ice water, extracted with methylenechloride, the organic phase is separated and the substance is dried. The carboxylic acid azide of the monomethylester is obtained by distilling off the solvent at the lowest possible temperature, the oily residue is covered with ethanol and carefully refluxed until the evolution of nitrogen ceases. Subsequently, the solvent is removed, the remaining carbamic acid ester of the Formula VI ($R_2 = COOC_2H_5$) is covered with 500 ml. of a 40% sodium hydroxide solution and 100 ml. of ethanol without further purification and the whole is refluxed for 8 hours. After cooling, the lower phase of the hydrolyzation mixture is separated, and concentrated hydrochloric acid is added to the upper phase until a pH-value of 2 is reached. The mixture is concentrated by evaporation and the residue is extracted with methanol. The solution is shaken with hydrogen in the presence of 10 g. of 5% palladium charcoal until the absorption of hydrogen ceases. The filtered solution is concentrated by evaporation under nitrogen, and the residue is treated further as described in Example 40(a) (after the hydrobromic acid has been distilled off). The total yield is 76 g. of L-α-methyl-DOPA in the form of the sesquihydrate (69.3% of the theory) (melting point: 298°–300° C.). $[\alpha]_D^{20} = 4.5°$ (2%, 0.1 N HCl).

(h) 72 g. of L-3,4-dipropyloxy-benzyl-methyl-malonic acid monomethylester obtained according to Example 20 are dissolved in 150 ml. of acetone and reacted with 25.8 g. of triethylamine in 150 ml. of acetone, 24.5 g. of chloroformic acid ethylester in 150 ml. of acetone and, after 45 minutes, with 23.5 g. of sodium azide in 75 ml. of water. After stirring for 1 hour, the whole is shaken with water and methylenechloride, the organic phase is separated, the substance is dried and concentrated by evaporation at a bath temperature of 40° C. and under reduced pressure. The crude azide is added dropwise to 500 ml. of a 20% hydrochloric acid at 95° C. and heated for another hour. The solution is concentrated by evaporation and the residue is refluxed with 500 ml. of a 48% hydrobromic acid for 3 hours under nitrogen. After concentration, the residue is dissolved in water, the solution is filtered with charcoal, adjusted to a pH-value of 6.5 with diethylamine and saturated with $SO_2$. The mixture is concentrated in vacuo and, when crystallization sets in, it is placed in ice, filtered and the substance is washed with a small amount of ice water and acetone. There are obtained 33 g. (67% of the theory) of L-α-methyl-DOPA (melting point: 298° C.). $[\alpha]_D^{20} = 4.6°$ (2%, 0.1 N HCl).

(i) 33.4 g. of L-3,4-diallyloxybenzyl-methyl-malonic acid monomethylester of Example 19 are reacted with 12 g. of triethylamine, 12 g. of chloroformic acid ethylester and 11 g. of sodium azide according to the process described in Example 40(a). The crude azide is boiled under reflux in 100 ml. of absolute ethanol for 1 hour whereby 2.3 l. of nitrogen are set free. After the solution has been concentrated, 35.2 g. (93.5% of the theory) of L-β-3,4-diallyloxyphenyl-α-methyl-α-ethoxy-carbonylamino-propionic acid methylester (Formula XI: $R = COOC_2H_5$) are obtained. 32 g. of this carbamic acid ester are boiled under reflux with 100 ml. of methanol and 80 ml. of a 50% KOH solution for 1 hour, then the alcohol is distilled off and the residue is maintained at an internal temperature of 120° C. for 3 hours. After cooling, the pH-value of the mixture is adjusted to 6 with glacial acetic acid. The precipitated L-β-allyloxy-hydroxy-phenyl-α-methyl-alanine of the Formula XII is filtered off, washed with acetone/ether and dried. (Melting point: 229°–230° C. with decomposition.) 17 g. of this compound are boiled under reflux with 125 ml. of 48% hydrobromic acid for 1 hour under nitrogen. After concentration the residue is dissolved in water, the solution is filtered with charcoal and the pH-value is adjusted to 6.5 with diethylamine. The substance is saturated with $SO_2$, filtered and concentrated slowly. When crystallization starts the substance is placed in ice for 3 hours, filtered off and washed with a small amount of ice water, then with a large amount of acetone. Yield: 12.75 g. of L-methyl-DOPA (85% of the theory). $[\alpha]_D^{20} = 4.5°$ (2%, 0.1 N HCl).

We claim:

1. A process for the manufacture of L-(—)-β-(3,4-dihydroxyphenyl)-α-methylalanine of the formula

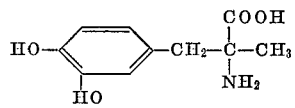

which process comprises resolving a monoester of the formula

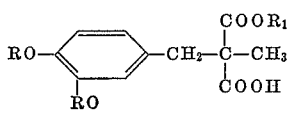

wherein R represents methyl and $R_1$ represents methyl, n-butyl, or benzyl, and if $R_1$ is methyl, R may also represent benzyl, into its optical isomers with an optically active base; esterifying the D-compound thus obtained to form an optically inactive diester of the formula

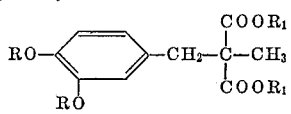

wherein R and $R_1$ have their earlier meaning and both $R_1$'s are the same, and then hydrolyzing one of the ester groups of this diester to re-form the starting compound; from the L-compound, forming the azide

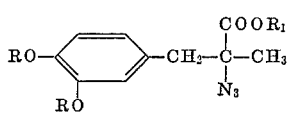

thermolyzing said azide in (A) an alkanol, an alkanoic acid, or an inorganic acid, directly to form a compound of the formula

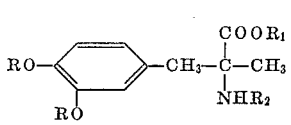

wherein R and $R_1$ have their earlier meaning and $R_2$ is respectively

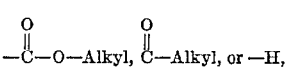

or (B) in an inert solvent to form the isocyanate

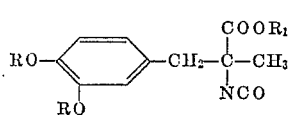

and then reacting said isocyanate with an alkanol, an alkanoic acid, or an inorganic acid to form a compound of the formula

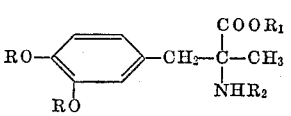

wherein R, $R_1$, and $R_2$ have their earlier meanings; and then hydrolyzing the R, $R_1$, and $R_2$ groups other than hydrogen with hydrobromic acid to form said L-(—)-β-(3,4-dihydroxyphenyl)-α-methylalanine.

2. A process for the manufacture of L-(—)-β-(3,4-dihydroxyphenyl)-α-methylalanine of the formula

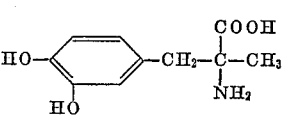

which process comprises resolving a dibenzyloxy-phenyl monoester of the formula

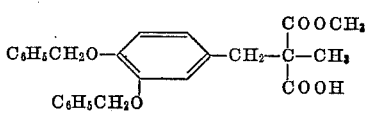

into its optical isomers with an optically active base; esterifying the D-compound thus obtained to form an optically inactive diester of the formula

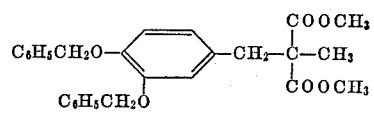

and then hydrolyzing one of the ester groups of this diester to re-form the starting compound; from the L-compound, forming the azide

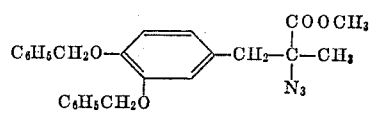

thermolyzing said azide in (A) an alkanol, an alkanoic acid, or an inorganic acid, directly to form a compound of the formula

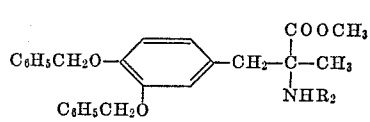

wherein $R_2$ is respectively

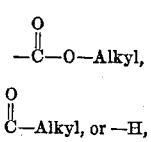

or (B) in an inert solvent to form the isocyanate

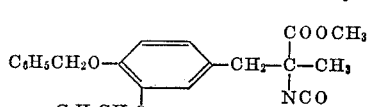

and then reacting said isocyanate with an alkanol, an alkanoic acid, or an inorganic acid to form a compound of the formula

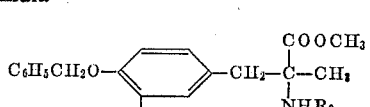

wherein $R_2$ has its earlier meaning; hydrolyzing the methyl and $R_2$ groups other than hydrogen with an alkali metal hydroxide to form

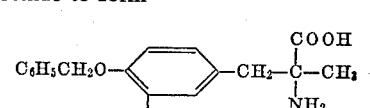

and then catalytically hydrogenating to remove the benzyl groups and form said L-(—)-β-(3,4-dihydroxyphenyl)-α-methylalanine.

3. A process for the manufacture of L-(—)-β-(3,4-dihydroxyphenyl)-α-methylalanine of the formula

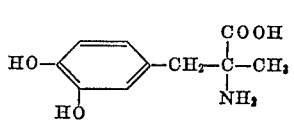

which process comprises resolving a diallyloxy-phenyl monoester of the formula

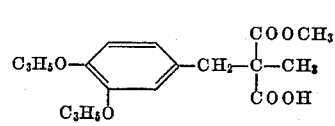

into its optical isomers with an optically active base; esterifying the D-compound thus obtained to form an optically inactive diester of the formula

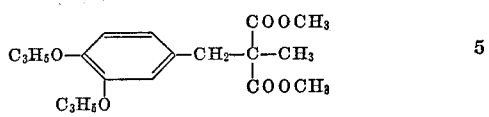

and then hydrolyzing one of the ester groups of this diester to re-form the starting compound; catalytically hydrogenating the L-compound to form the corresponding dipropoxy compound

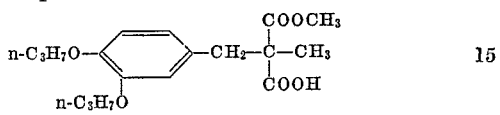

from this compound, forming the corresponding azide

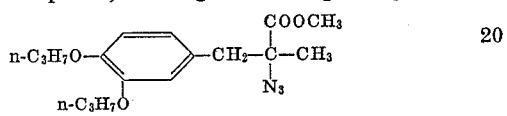

thermolyzing said azide (A) in an alkanol, an alkanoic acid, or an inorganic acid, directly to form a compound of the formula

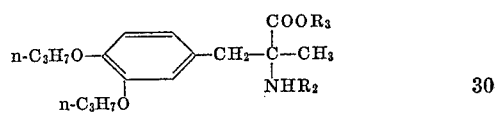

wherein $R_2$ is respectively

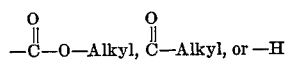

and $R_3$ is hydrogen or methyl, or (B) in an inert solvent to form the isocyanate

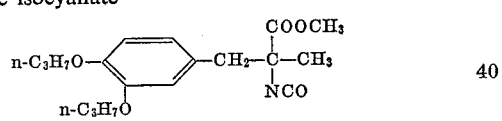

and then reacting said isocyanate with an alkanol, an alkanoic acid, or an inorganic acid to form a compound of the formula

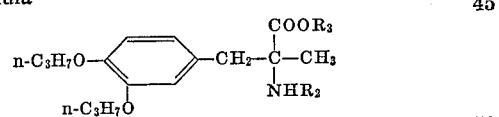

wherein $R_2$ and $R_3$ have their earlier meanings; and then hydrolyzing the n-propyl, $R_2$, and $R_3$ groups other than hydrogen with hydrobromic acid to form said L-(—)-β-(3,4-dihydroxyphenyl)-α-methylalanine.

4. A process for the manufacture of L-(—)-β-(3,4-dihydroxyphenyl)-α-methylalanine of the formula

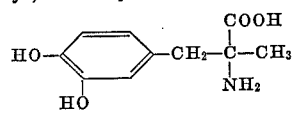

which process comprises resolving a diallyloxy-phenyl monoester of the formula

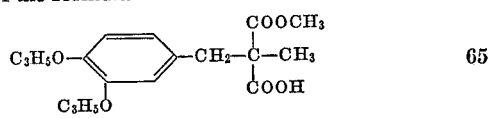

into its optical isomers with an optically active base; esterifying the D-compound thus obtained to form an optically inactive diester of the formula

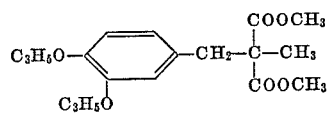

and then hydrolyzing one of the ester groups of this diester to re-form the starting compound; from the L-compound, forming the azide

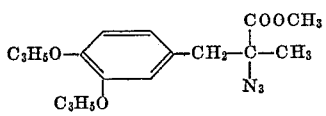

thermolyzing said azide (A) in an alkanol, an alkanoic acid, or an inorganic acid, directly to form a compound of the formula

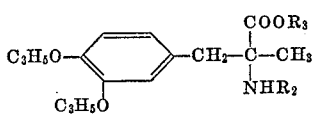

wherein $R_2$ is respectively

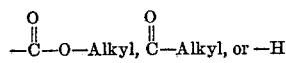

and $R_3$ is hydrogen or methyl, or (B) in an inert solvent to form the isocyanate

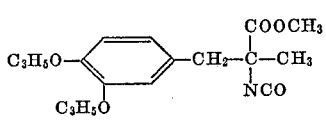

and then reacting said isocyanate with an alkanol, an alkanoic acid, or an inorganic acid to form a compound of the formula

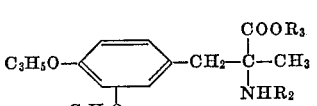

wherein $R_2$ and $R_3$ have their earlier meanings; and then hydrolyzing the allyl groups and $R_2$ and $R_3$ groups other than hydrogen with hydrobromic acid to form said L-(—)-β-(3,4-dihydroxyphenyl)-α-methylalanine.

5. A process as in claim 4 wherein the allyoxy groups of the compound

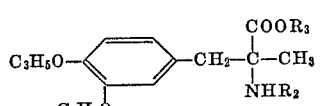

are converted to n-propyloxy groups by catalytic hydrogenation prior to said hydrolysis with hydrobromic acid.

6. A process as in claim 4 wherein one of the allyloxy groups of the compound

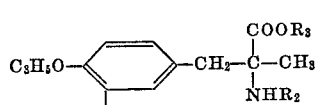

together with $R_2$ and $R_3$ groups other than hydrogen, is first hydrolyzed with an alkali metal hydroxide, and the remaining allyloxy group of the compound thus obtained is then hydrolyzed with hydrobromic acid.

7. A process as in claim 6 wherein the monoallyloxy compound obtained after treatment with said alkali metal hydroxide is catalytically hydrogenated to convert the remaining allyloxy group to an n-propyloxy group prior to hydrolysis of the remaining ether linkage with hydrobromic acid.

8. L-α-(3,4 - dimethoxy-benzyl)-α-methyl-malonic acid mono methylester.

9. L-α-(3,4 - dimethoxy-benzyl)-α-methyl-malonic acid mono benzylester.

10. L-α-(3,4-dimethoxy-benzyl)-α-methyl-malonic acid mono n-butylester.

11. L-α-(3,4 - diallyloxy-benzyl)-α-methyl-malonic acid mono methylester.

References Cited

UNITED STATES PATENTS

| | | | |
|---|---|---|---|
| 3,294,835 | 10/1966 | Hofmann et al. | 260—473 |
| 3,366,679 | 1/1968 | Rheinhold et al. | 260—519 |
| 3,395,176 | 7/1968 | Sletzinger | 260—519 |

LORRAINE A. WEINBERGER, Primary Examiner

D. STENZEL, Assistant Examiner

U.S. Cl. X.R.

260—349, 519